United States Patent [19]
Hodgins et al.

[11] Patent Number: 4,906,379
[45] Date of Patent: Mar. 6, 1990

[54] HYDROPHILIC ARTICLE AND METHOD OF PRODUCING SAME

[75] Inventors: Leonard T. Hodgins, Closter, N.J.; Edgar Samuelson, Brooklyn, N.Y.

[73] Assignee: Membrex, Inc., Garfield, N.J.

[21] Appl. No.: 149,552

[22] Filed: Jan. 28, 1988

Related U.S. Application Data

[63] Continuation-in-part of Ser. No. 7,623, Jan. 28, 1987.

[51] Int. Cl.[4] .............................................. B01D 13/00
[52] U.S. Cl. .................................... 210/638; 210/644; 210/651; 210/654; 210/500.38; 210/500.43
[58] Field of Search ...................... 210/500.24, 500.38, 210/638, 198.2, 644, 651, 654, 500.43; 427/244, 245, 246

[56] References Cited

U.S. PATENT DOCUMENTS

| | | | |
|---|---|---|---|
| 2,534,204 | 12/1950 | Mowrey | 260/404.5 |
| 3,948,823 | 4/1976 | Lee et al. | 260/2.5 M |
| 4,415,631 | 11/1983 | Schutijser | 210/198.2 X |
| 4,501,785 | 2/1985 | Nakanishi | 428/195 |
| 4,584,103 | 4/1986 | Linder et al. | 210/650 |
| 4,614,714 | 9/1986 | Kusakabe et al. | 435/25 |

*Primary Examiner*—Frank Spear
*Attorney, Agent, or Firm*—John P. White

[57] ABSTRACT

This invention provides a matrix comprising molecules of a suitable polymer which provides solely on the surface of the matrix sufficient uncharged substituted amide groups to render the surface hydrophilic. The invention also provides an article of manufacture comprising the matrix.

Another aspect of the invention provides a method of producing a matrix having a hydrophilic surface which comprises treating molecules of a suitable polymer so as to provide solely on the surface of the matrix sufficient uncharged, hydrophilic substituted amide groups to render the surface hydrophilic.

Another embodiment of the invention concerns improved methods of filtration, ultrafiltration, microfiltration, reverse osmosis, dialysis, prevaporation, sieving, affinity chromatography, affinity purification, affinity separation, or affinity adsorption which comprises using the article of manufacture.

75 Claims, 1 Drawing Sheet

SOLID-LIQUID CONTACT ANGLE

HYDROPHOBIC    HYDROPHILIC

HYDROPHILIC ARTICLE AND METHOD OF PRODUCING SAME

This application is a continuation-in-part of U.S. Ser. No. 7,623, filed Jan. 28, 1987, the contents of which are hereby incorporated by reference.

BACKGROUND OF THE INVENTION

Throughout this application various patents and publications are referenced and citations are provided in parentheses. The disclosure of these patents and publications in their entireties are hereby incorporated by reference into this application in order to more fully describe the state of the art to which this invention pertains.

Filters, membranes, beads, and other porous and nonporous articles are widely used for separating and concentrating substances present in liquid environments. For example, filters and membranes have utility in applications involving reverse osmosis, ultrafiltration, microfiltration, pervaporation and dialysis. In general such applications rely upon pressure to effect separation or concentration. Therefore, it is important that the filter or membrane material maintains its physical integrity and desired properties under pressure.

It is well-known that polymers are useful raw materials for the production of filters, membranes, and other separation and chromatography media. Typically, the polymers useful for the fabrication of rigid porous articles tend not to be dissolved by, or swell in, water and are commonly referred to as being hydrophobic in nature, i.e., acrylonitrile polymers or copolymers. Unfortunately, the polymeric qualities which render crystallinity and physical strength to the formed porous articles also cause adsorptive interactions during separation or concentration work. As a consequence, the porous article becomes fouled by materials in the feed stream to be separated or concentrated. Such fouling is a major problem because the formation of a fouling layer upon the porous article's surface interferes with the article's efficiencies and specificities thereby necessitating frequent and costly cleaning treatments. Other types of polymeric compositions which tend not to exhibit adsorptive interactions during separation work also tend to lack the necessary physical strength for pressure driven separations. These compositions are pressure sensitive and can be readily compressed and distorted by applied pressure. Agarose and polyacrylamide are examples of such compositions and are described as hydrated gels because throughout their structures they are hydrophilic in nature, i.e. interacting with water and swelling thereby.

Attempts have been made to overcome the disadvantages of hydrophobic-type polymeric compositions by chemically modifying the surface of formed porous articles. Linder et al., U.S. Pat. Nos. 4,584,103 (1986) and 4,477,634 (1984), describe methods of increasing the pressure stability of a polyacrylonitrile-containing membrane by reaction with hydroxylamine followed by additional steps including reaction with a poly-functional oligomer and a compound containing at least one ionic group. A disadvantage of this method, however, is that the resulting modified membranes contain charged groups, thereby making them unsuitable for some applications. Additionally, the methods suffer from defects such as the need for expensive reagents and poor control over the extent of modification.

Sano et al., U.S. Pat. No. 4,265,959 (1981), describes a method for the preparation of semipermeable membranes which comprises sulfonating porous membranes of acrylonitrile polymers. In the disclosed method, a porous membrane is exposed to a gasous sulfonating agent, i.e. sulfuric anhydride, under pressure. The resulting modified membrane is claimed to possess superior chemical, mechanical and thermal properties due to cross-linking of its surface molecules and its increased hydrophilic character. However, the Sano et al. method suffers from similar defects as described above; that is, the need for expensive reagents and poor control over the extent of modification. In fact, the disclosure notes that if the whole membrane is sulfonated it becomes brittle.

In Sano et al., U.S. Pat. No. 4,147,745 (1979), a surface-modifying method is disclosed which comprises exposing a membrane of acrylonitrile-type polymers to a plasma. The resulting membrane is claimed to have a surface whose polymer molecules are cross-linked thereby increasing its physical strength. Nakanishi, U.S. Pat. No. 4,501,785 (1985) relates to a method of hydrophilizing a porous membrane made of a polyolefin, i.e. polyethylene, by coating the surfaces which define the pores with polyethylene glycol. These methods also involve expensive procedures and the Nakanishi method, additionally, is limited to membranes whose pores can accommodate the polyethylene glycol molecule.

The subject invention provides membranes and other porous articles having superior physical integrity to withstand pressure driven separations and hydrophilic surfaces to prevent fouling. The procedures of the present invention comprises a chemical reaction between nitrile groups of hydrophobic-type polymer and an aldehyde to produce hydrophilic amide groups only on the surface of a formed article. The fundamental chemistry of this reaction is well-known in the art (see e.g., Magat, E. E., et al., J. Am. Chem. Soc., 1951, 73: 1028–1037; Mowry, D. T., U.S. Pat. No. 2,534,204 [1950]). Mowry, British Patent No. 677,516 (1948) describe a method utilizing this chemical reaction for the synthesis of "nylon" type polymers. However, the Mowry method produces polymers having the resulting amide groups as part of the polymer backbone and, therefore, articles formed from these polymers have the amide groups throughout their structures. In contrast, the present invention provides a method of reacting the nitrile groups pendent to the polymer backbone in preformed articles. Additionally, the inventive method enables one to control the reaction rate so that only the surface of the article contains amide groups thereby providing fouling resistance to the surface while maintaining the physical strength of the article.

SUMMARY OF THE INVENTION

This invention provides a matrix comprising molecules of a suitable polymer which provides solely on the surface of the matrix sufficient uncharged substituted amide groups to render the surface hydrophilic. The invention also provides a matrix comprising molecules of a suitable polymer having reactive pendent groups which provide solely on the surface of the matrix sufficient uncharged, hydrophilic polar groups to render the surface hydrophilic, the polar groups having been obtained by derivatization of the pendent groups of the polymer. Additionally, the invention provides an article of manufacture comprising the matrix.

Another aspect of the invention provides a method of producing a matrix having a hydrophilic surface which comprises treating molecules of a suitable polymer so as to provide solely on the surface of the matrix sufficient uncharged, substituted amide groups to render the surface hydrophilic.

Another embodiment of the invention concerns improved methods of filtration, ultrafiltration, microfiltration, reverse osmosis, dialysis, pervaporation, sieving, affinity chromatography, affinity purification or affinity separation which comprises using the article of manufacture.

Another embodiment of the invention is a modified article of manufacture comprising a preformed article and the matrix described above, wherein the matrix covers at least a portion of the exterior of the preformed article. The invention also involves a method of producing the modified article which comprises forming an article in which at least a portion of the exterior of the article comprises molecules of a suitable polymer and treating the article so formed so as to provide solely on the exterior of the article sufficient uncharged, hydrophilic substituted amide groups to render the exterior hydrophilic.

DETAILED DESCRIPTION OF THE INVENTION

Figure 1:
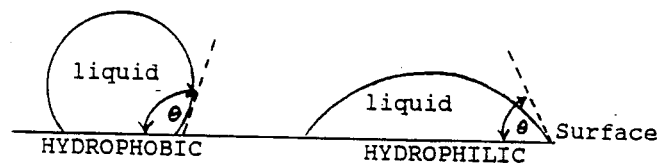
FIG. 1—illustrates the solid-liquid contact angle for a hydrophobic and a hydrophilic surface.

This invention provides a matrix comprising molecules of a suitable polymer which provides solely on the surface of the matrix, sufficient uncharged, substituted amide groups to render the surface hydrophilic.

Suitable polymers for the practice of the present invention are polymer having as pendent groups substituted amide groups or groups which can be derivatized to substituted amide groups. The polymer may be a homopolymer or a copolymer. In copolymers only one monomer need contain as pendent groups the substitute amides or groups which can be derivatized to substituted amide groups. The other monomers may, but need not, contain these pendent groups. In embodiments where the pendent groups are nitrile groups, suitable monomers which may be present with the nitrile-containing monomer in a copolymer are monomers capable of polymerizing with the nitrile-containing monomer. Examples of such monomers include styrene-type monomers, such as styrene, methylstyrene, ethylstyrene, nitrostyrene, chlorostyrene, bromostyrene, chloromethylstryene; acrylic or methacrylic acid ester-type monomers; conjugated dienes; halogenated olefins; vinylether monomers and like monomers. The polymerization may be performed by standard techniques in the art, such as suspension polymerization or emulsion polymerization in an aqueous system. The polymer may also be blended with other polymers which may or may not contain substituted amide groups or groups which can be derivatized to substituted amide groups. The polymer can also be grafted to another polymer.

The matrix may comprise molecules of essentially any polymer containing the appropriate pendent groups. Merely by way of example, suitable polymers include polymers containing acrylonitrile-type monomers, cyanostyrene monomers, pentenenitrile monomers, butenenitrile monomers or cyanoethylester acrylic acid monomers. The presently preferred polymers contain acrylonitrile-type monomers, such as acrylonitrile, methacrylonitrile, chloroacrylonitrile, fluoroacrylonitrile and cinnamnitrile, particularly acrylonitrile or methacrylonitrile.

Suitable substituted amide groups are groups which are hydrophilic, that is showing an affinity to water. These amide groups may be obtained by derivatization of the pendent groups of the polymer or they may be "prefabricated" and then deposited or grafted directly onto the polymer at the surface of the matrix. It is likewise possible that one can deposit nitrile or other pendent groups on the surface of the matrix and then derivatize all or a portion of the groups to the substituted amide groups to render the surface hydrophilic. Likewise, monomers containing the appropriate pendent groups or amide groups may be deposited or grafted onto the surface of the matrix.

The acyl portion of the amide groups may comprise an alkyl group or an aryl group depending on the structure of the groups prior to derivatization. The amino portion of the amide groups may be mono- or di-substituted or unsubstituted. In the presently preferred embodiment, the amide groups are predominately mono- and di-substituted groups. The substituted portion may comprise an alkyl group or an aryl group. Presently, alkyl groups are preferred, particularly methylol groups. In the most preferred embodiments, the substituted amide groups are N-methylolamides.

The surface of a polymer matrix has voids formed by imperfections in the outer perimeter of the matrix and micropores formed by the molecular structure of the matrix. The term "surface" is intended to include the polymers or portions thereof which define these voids and micropores. If the matrix is in the form of a porous article, "surface" is also intended to include the polymers or portions thereof which define the pores of the article.

It is anticipated that small amounts of substituted amide groups may be present in areas of the matrix other than the surface. However, the invention provides that only the surface of the matrix will have sufficient substituted amide groups to render the surface hydrophilic. The other areas of the matrix will not contain sufficient amide groups to render those areas hydrophilic.

The substituted amide groups are uncharged at neutral or near-neutral pH's. Of course, it is possible to induce a charge on the substituted amide groups by changing the surrounding environment. Such a variation is not to be regarded as a departure from the spirit and scope of the invention and all such modifications as would be obvious to one skilled in the art are intended to be included herein.

The matrix may also comprise a plurality of ligands attached to a portion of the hydrophilic substituted amide groups or derivatives thereof. Suitable ligands include any ligand capable of attaching to the substituted amide groups of the matrix or to a derivative of the substituted amide group. Presently, preferred ligands comprise bio-selective, affinity groups which selectively bind to biologically active substances and are typically used for the purification of biologically active substances. The inventory of useful affinity ligands is large and rapidly increasing. Most often, such ligands are derived from nature (i.e., biological originating substances); while, others are wholly or partially synthetic (i.e., bio-mimic substances). Many ligands can be described by traditional biochemical classes such as nucleotides, polynucleotides, nucleic acids (including DNA and RNA), carbohydrates, saccharides, polysaccharides, lipids, amino acids, peptides and proteins. Others can be described as combinations of these substances as lipo-polysaccharides, lipo-proteins, and nucleo-proteins. In addition, sub-class terms are often useful (e.g., enzymes and antibodies as sub-classes of proteins). Many other useful affinity ligands are better described by bio-function, such as steroids, hormones, vitamins, enzyme or metabolic co-factors, enzyme inhibitors, enzyme reactors, drugs, drug receptors, antibiotics, neurotransmittors, antagonists, etc. Still other ligands are described as chromophores, dyes, ion-exchangers, amphiphiles, and the like.

The ligand may, but need not, also comprise a coupling molecule which is disposed between the substituted amide group or derivative thereof and the bioselective functional portion of the ligand when the ligand is attached to the matrix. Numerous coupling molecules are well known and may be utilized by the present invention for attaching affinity ligands. Noteworthy reagents for this purpose are cyanogen halides, triazinyl halides (e.g., trihalo-s-triazine and substituted halo-s-triazines), sulfonyl halides (e.g., alkyl and/or aryl sulfonyl-halides, including bis-sulfonyl halides), acyl halides (e.g., bis-acyl-halides), vinylsulfones, epoxides (e.g., bis-oxiranes) and the like. Alternatively, the present invention can utilize displacement reagents for coupling ligands. Such reagents are reacted with surface groups of the present invention and subsequently undergo displacement reaction with the affinity ligand of choice. Illustration of the reaction sequence is provided by use of sulfonyl halides such as aryl-sulfonyl halides (e.g., tosyl-halides), alkyl-sulfonyl halides (e.g., methane sulfonyl halide), halo-alkyl-sulfonyl halides (e.g., trifluoroethane sulfonyl halides), halopyrimidines (e.g., 2-fluoro-1-methylpyridinium toluene-4-sulfonate) and the like. Other preferred ligands and methods for attaching the ligands to the matrix of this invention will become apparent to those skilled in the art of affinity sorption and enzyme immobilization from a consideration of the specification of the present application. Such variations are intended to be included herein.

In some embodiments of the invention, a portion of the molecules of the polymer are crosslinked to other such molecules. Crosslinking provides properties in the matrix which in most applications are desirable, e.g. increased structural rigidity and increased resistance to organic solvents. Preferably, the crosslinking is between substituted amide groups. In embodiments where the substituted amide groups are N-methylolamide groups, the crosslinking is thought to be by means of methylene-bis-amide.

The invention also provides a matrix comprising molecules of a suitable polymer having reactive pendent groups which provides solely on the surface of the matrix sufficient uncharge, hydrophilic polar groups to render the surface hydrophilic, the polar groups having been obtained by derivatization of the pendent groups of the polymer. In the preferred embodiments the reactive pendent groups are nitrile groups and the polar groups are substituted amide groups.

Another aspect of the invention provides an article of manufacture which comprises the matrix. Preferably, at least a portion of the exterior of the article comprises the hydrophilic surface of the matrix. The article may be porous or nonporous. If the article is a porous article, the "exterior" is intended to include the boundaries which defined the pores. Accordingly, in embodiments where the article is a porous article, it is preferred that the boundaries which define pores comprises the hydrophilic surface of the matrix. Filters, membranes, screens, beads (porous and nonporous), hollow and solid filaments and fibers, fabrics, chromotography and separation media, and like articles are the preferred articles of manufacture.

Presently, the most preferred embodiment of the invention is a porous article comprising a matrix wherein the polymer comprises acrylonitrile or methacrylonitrile and the hydrophilic substituted amide groups are N-methylolamide groups. The molecules of the polymer may also be crosslinked to other such polymer molecules in the matrix.

The invention also provides a method of producing a matrix having a hydrophilic surface which comprises treating molecules of a suitable polymer so as to provide solely on the surface of the matrix sufficient uncharged substituted amide groups to render the surface hydrophilic.

Hydrophilicity of a solid surface relates to the surface's affinity toward aqueous solutions. For membranes and other porous articles, hydrophilicity provides a means of measuring an article's biocompatibility, i.e. its ability to be used effectively with proteins and similar substances without encountering problems of fouling. Although hydrophilicity is not quantitatively defined in the industry, it can be qualitatively measured by water spreading over the solid surface or by the angle ($\theta$) of contact between the liquid surface and the solid surface when a drop of liquid is resting on the solid surface (see FIG. 1).

The present invention provides matrixes having surfaces whose hydrophilicity can be preselected by controlling reaction rates, reagent concentrations, catalyst concentration, etc. and whose hydrophilicity ranges from nearly that of the untreated nitrile-containing polymer to hyperhydrophilic (e.g. contact angles below about 15 degrees). In the preferred embodiments, the hydrophilic surface has a contact angle less than about 30 degrees when measured in a pH between 2 and 12 and more preferably less than about 15 degrees. Although in the most preferred embodiments the resulting matrixes are hyperhydrophilic, the treating of matrixes according to the claimed method to produce matrixes which are relatively more hydrophilic than the original, untreated matrixes is considered to be within the spirit and scope of the present invention, regardless of whether the resulting matrixes would be considered hydrophilic or hydrophobic by one skilled in the art.

Suitable polymers include polymers which contain pendent groups which can be derivatized to substituted amide groups, e.g. nitrile-containing polymers. In some embodiments of the invention, treating comprises contacting the molecules of the nitrile-containing polymer with an aldehyde or an aldehyde-generating compound. Essentially, any aldehyde may be used in the practice of this invention. However, the molecular size of the aldehyde molecule may limit the usefulness of the aldehyde in embodiments where the article or matrix is in the form of a porous article. In such instances, the size of the pores will determine the suitability of the aldehyde by imposing an upper limit on the aldehyde's molecular size. The most preferred aldehyde is formaldehyde and the most preferred aldehyde-generating compound is a formaldehyde-generating compound, particularly dimethoxymethane, trioxane and paraformaldehyde.

The duration of the contacting of the molecules of the nitrile-containing polymer with the aldehyde or the aldehyde-generating compound is long enough to permit the formation of sufficient substituted amide groups to render the surface hydrophilic but not to hydrophilize the entire matrix structure.

The contacting with the aldehyde or the aldehyde-generating compound may also be carried out in the presence of a catalyst. In some embodiments the catalyst comprises an acid, preferably a blend of a strong acid and a weak acid. A variety of strong acids are known to those skilled in the art and can be used in the practice of the present invention. Common mineral acids as hydrochloric, phosphoric and sulfuric are presently preferred. Other preferred strong acids include alkylsulfuric or alkylsufonic acids or halosulfuric acids or the like, such as trifluoromethane sulfonic acid or fluorosulfuric acid. Preferred weak acids include acetic acid. The acid may also be generated by an acid-generating substance, such as boron trifluoride or aluminum chloride or the like. Other suitable acids will become apparent to those skilled in the art upon the reading of the present application and these acid are intended to be within the scope and spirit of the present invention.

The rate of producing the matrix may be controlled by controlling the strength of the catalyst. In embodiments where the catalyst is an acid, the strength of the acid includes both the quantity and inherent strength. Additionally, the degree of hydrophilicity of the hydrophilic surface may be controlled by controlling the ratio of concentrations of the strong acid, the weak acid, and the aldehyde or aldehyde-generating compound.

In some embodiments, the matrix is produced in the form of a porous article wherein the hydrophilic surface of the matrix defines the pores of the article. Preferably, the porous article is a membrane, filter, or screen. In the preferred practice of the invention, the polymer comprises an acrylonitrile-type monomer. Especially useful are acrylonitrile or methacrylonitrile monomers. When the polymer is a nitrile-containing polymer, it may be present throughout the matrix. However, only a portion of the nitrile groups of the polymer on the surface of the matrix are derivatized to substituted amide groups, preferably N-methylolamide groups. The remaining nitrile groups remain underivatized thereby providing physical integrity to the matrix. In embodiments where the matrix is produced in the form of a porous article, the hydrophilic surface of the matrix defines pores in the porous article.

In other embodiments, the method may also comprise contacting the hydrophilic surface of the matrix with reagents capable of donating a plurality of ligands so as to attach the ligands to a portion of the substituted amide groups. Suitable ligands included those capable of attaching to the substituted amide groups. In the preferred embodiments of the invention, the substituted amide groups are N-methylolamide groups and each of the preferred ligands is a bio-selective affinity group.

The molecules of the polymer may also be crosslinked to other such molecules, preferably the crosslinking is between the substituted amide groups of the molecules on the surface of the matrix. In the embodiments where the substituted amide groups are N-methylolamide groups, the crosslinking is by means of methylene-bis-amide.

When the polymer is contacted with an aldehyde or an aldehyde-generating compound, the contacting is preferably effected by soaking the matrix in a reagent bath containing the aldehyde or the aldehyde-generating compound. The time of soaking, the temperature of the reagent bath, and the concentration of the reagents will depend on the type of aldehyde or aldehyde-generating compound used, the type of nitrile-containing polymer present, the quantity and strength of the catalyst, if present, and the matrix properties desired. In order to prevent polymerization of the aldehyde or re-polymerization of the polymer, the water content of the reaction bath should be kept low. The precise level required will vary with the particular acid used, but the level in all cases should be such as to avoid competing reactions. In the embodiments where the nitrile-containing polymer comprises an acrylonitrile-type monomer, the hydrophilic substituted amide groups are N-methylolamide groups, and the contacting is effected with a formaldehyde-generating compound in the presence of an acid, the soaking bath reaction is for about 1 minute to about 48 hours and the temperature of the reagent bath is in a range of about 1° C. to about 90° C. In the preferred embodiments, a portion of the molecules of the polymer on the surface of the matrix are crosslinked to other such molecules, the duration of the soaking bath reaction is for several minutes to about 24 hours and the temperature of the reagent bath is in the range of about 10° C. to about 60° C. If the substituted amide groups are N-methylolamide groups, the crosslinking is by means of methylene-bis-amide.

The invention also provides improved methods of filtration, ultrafiltration, microfiltration, reverse osmosis, dialysis, pervaporation, or sieving, where the improvement comprises using a porous or non-porous article having a portion of its exterior comprising the hydrophilic surface of the matrix. The article of the present invention may also be used in affinity chromatography, affinity purification, affinity separation, or affinity adsorption.

Another aspect of the invention is a modified article of manufacture comprising an article and the matrix, where the matrix covers at least a portion of the exterior of the article. In certain embodiments, at least a portion of the exterior of the article comprises the hydrophilic surface of the matrix. Suitable articles are preformed articles having a nitrile-containing polymer on its exterior. In preferred embodiments, the nitrile-containing polymer is throughout the article. In embodiments where the modified article is a porous article, the hydrophilic surface of the matrix covers the portions of the article's exterior which define the pores. Preferably, the preformed article is a filter, membrane, or screen. At present, the most preferred embodiments are membranes comprising acrylonitrile-type polymers and N-methylolamide groups as the hydrophilic substituted amide groups. A portion of the molecules of the polymer may also be crosslinked. Preferably, the crosslinking is by means of methylene-bis-amide groups.

The invention also provides a method for producing a modified article which comprises forming an article in which at least a portion of the exterior of the article comprises molecules of a suitable polymer and treating the article so formed so as to provide solely on the exterior of the article sufficient uncharged, hydrophilic substituted amide groups to render the exterior hydrophilic. In the preferred embodiments, the treating comprises contacting the preformed article with an aldehyde or aldehyde-generating compound. At present, the most preferred aldehyde is formaldehyde. The formaldehyde may be generated by dimethoxymethane, trioxane, or paraformaldehyde; especially useful is trioxane and dimethoxymethane.

The contacting may also be performed in the presence of a catalyst. Preferred catalysts include an acid or an acid-generating substance, preferably a blend of a strong mineral acid or a mineral acid-generating substance and a weak acid. The rate of derivatization, and hence the rate of producing the modified article, may be controlled by controlling the strength of the catalyst. Additionally, the degree of hydrophilicity can be controlled by the ratio of concentrations of the strong acid, the weak acid, and the aldehyde In the preferred embodiments, the hydrophilic exterior of the modified article defines pores and the modified article itself is porous, such as a membrane, filter or screen. Preferably, the substituted amide groups are N-methylolamide groups.

In some embodiments the method further comprises contacting the hydrophilic exterior of the modified article with reagents capable of donating a plurality of ligands so as to attach the ligands to a portion of the substituted amide groups.

Some of the molecules of the polymer may also be crosslinked. Preferably, the crosslinking is between the substituted amide groups and is by means of methylene-bis-amide.

Another aspect of the invention is an improved method of filtration, ultrafiltration, microfiltration, reverse osmosis, dialysis, pervaporation, or sieving, or similar operation, where the improvement comprises using the modified article. The invention also concerns improved methods of affinity chromatography, affinity purification, affinity separation and affinity adsorption, wherein the improvement comprises using the modified article.

Certain embodiments of this invention are exemplified in the examples which follow. These examples are set forth to aid in an understanding of the invention but are not intended to, and should not be construed to, limit in any way the invention as set forth in the claims which follow.

EXAMPLE 1

A non-porous article in the form of a thin flat sheet was treated in a reagent bath containing formaldehyde. The article was composed of polyacrylonitrile polymers of greater than 90% acrylonitrile monomers. The reagent bath contained 34.2 parts of concentrated sulfuric acid, 13.1 parts of concentrated acetic acid, 37.8 parts of formic acid and 14.9 parts of trioxane as the formaldehyde source. The freshly composed reagent bath was allowed to equilibrate at 30° C. for 1 hour before use. The article was treated in the reaction bath at 30° C. for 16 hours, then withdrawn, rinsed with water and soaked at ambient temperature for 60 minutes in an aqueous bath consisting of 3.8 part sodium borate, pH=9.

After rinsing the article with water and blotting it dry, it could be wetted by water which readily spread upon the hydrophilic surface. The original, untreated article, in contrast, did not wet nor spread water.

EXAMPLE 2

A porous article in the form of a thin, flat sheet membrane was treated for four [4] hours in a formaldehyde bath the composition of which is described in Example 1. The membrane was composed of polyacrylonitrile polymers of greater than 90% acrylonitrile monomers. Following the bath treatment period, the membrane was soaked in a water bath at 2° C. for 30 minutes. The membrane was then soaked for 60 minutes at ambient temperatures in an aqueous bath consisting of 3.8 parts sodium borate, pH=9.

It was observed that drops of water applied to the surface of the treated membrane spread readily. Similar drop tests with control, untreated membranes showed only beads of water without spreading. The treated membrane was mounted on a conventional stirred cell apparatus and tested for fluid flux, protein rejection and, after exposure to protein, for recovery of fluid flux.

It became evident from the test results that, in contrast with untreated membrane, the treated membrane resisted fouling by protein and recovered fluid flux after a simple flushing operation (see Table 1).

TABLE 1

| Protein | Buffer Flux* [liters/hour-square meter] | |
|---|---|---|
| | Untreated Membrane | Treated Membrane |
| none | 149 +/− 7 | 178 +/− 9 |
| myoglobin | 65 | 184 |
| ovalbumin | 52 | 184 |
| bovine serum albumin | 53 | 179 |
| bovine gamma-globulins | 24 | 175 |

*10 psi transmembrane pressure difference

EXAMPLE 3

A porous article in the form of a membrane was treated for three (3) hours in a reagent bath at 30° C. The article was composed of greater than 90% acrylonitrile monomers. The reagent bath contained 15.0 parts of trioxane, 13.2 parts of acetic acid, 37.4 parts of formic acid and 34.4 parts of concentrated sulfuric acid. After treatment, the article was rinsed with water and soaked at ambient temperature for 60 minutes in an aqueous bath consisting of 3.8 parts sodium borate, pH=9.

After rinsing the article with water and blotting it dry, it could be wetted by water which readily spread upon the hydrophilic surface. In addition to spreading of drops of water, hydrophilicity of the membrane was indicated by the solid-liquid contact angle made by application of a drop of an aqueous solution applied to the membrane surface according to the method of George M. Whitesides and co-workers (Stephen Randell Holmes-Farley, Robert H. Reamey, Thomas J. McCarthy, John Deutch and George M. Whitesides, *Langmuir* 1:725–740, 1985). The contact angle measured 30 seconds after drop application was 4 degrees for the treated membrane and 46 degrees for the untreated membrane. As reference, the contact angles also were measured for conventional, commercially available membranes made of other materials. It became obvious from these results that the present invention is markedly "hyperhydrophilic" as compared with well known "hydrophilic" membrane surfaces. For illustration, the comparative results are provided in Table 2.

TABLE 2

| Membrane | Contact Angle degrees* |
|---|---|
| Present Invention (treated) | 4 |
| Present Invention (untreated) | 46 |
| Conventional Polyethersulfone | 65 |
| "Hydrophilized" Polyethersulfone | 44 |

TABLE 2-continued

| Membrane | Contact Angle degrees* |
|---|---|
| "Hydrophilic" Cellulosic | 24 |

*Contact angle measured at 30 seconds after drop application to surface.

In addition to contact angle measurements, the hydrophilicity of the treated membrane was examined by measurements of fluid flux on a conventional stirred cell apparatus before and after exposure to a protein. It became evident from the test results that the treated membrane resisted fouling by protein and recovered fluid flux after a simple flushing operation (see Table 3).

TABLE 3

| SAMPLE | BUFFER FLUX AFTER SAMPLE FILTRATION* [LITERS/HOUR-SQUARE METER] |
|---|---|
| BUFFER | 596 |
| BOVINE SERUM ALBUMIN | 630 |
| BOVINE GAMMA-GLOBULINS | 589 |

*10 PSI TRANSMEMBRANE PRESSURE DIFFERENCE

EXAMPLE 4

A porous article in the form of a membrane composed of polyacrylonitrile containing polymers was treated for 60 minutes at 23° C. in a bath containing dimethoxymethane and sulfuric acid. The bath consisted of 25 parts of dimethoxymethane and 75 parts of sulfuric acid. The bath was equilibrated at 23° C. for 1 hour before use. Following the reaction bath treatment, the membrane was soaked sequentially in a water bath at 2° C. for 30 minutes and then in an aqueous bath containing 3.8 parts of sodium borate, pH=9, at ambient temperature for 60 minutes.

As in the above examples, it was observed that drops of water applied to the surface of the treated membrane spread readily. Similarly, when the membrane was examined in a stirred cell for recovery of fluid flux after exposure to protein, it became evident that the treated membrane resisted fouling by protein and recovered fluid flux after a simple flushing operation. For example, the treated membrane exhibited an initial buffer flux of 44.7 liters per hour-square meter at 20 psi, transmembrane pressure, before exposure to protein. After ultrafiltration of individual protein solutions of myoglobin, chymotrypsin, ovalbumin, and bovine serum albumin, the initial buffer flux was recovered for each protein studied.

EXAMPLE 5

A membrane composed of polyacrylonitrile-containing polymers was treated in a reaction bath containing 21.9 parts dimethoxymethane, 65.3 parts of concentrated sulfuric acid and 12.8 parts of acetic acid. The treatment was conducted for 1 hour at 23° C. The treated membrane was soaked sequentially in a cold water bath and a borate bath as described in example #4, above.

As in example #4, above, it was observed that drops of water spread readily when applied to the surface of the treated membrane. Similarly, when the membrane was examined in a stirred cell for recovery of fluid flux after exposure to protein, it became obvious that the treated membrane resisted fouling by protein and recovered fluid flux after a simple flushing operation.

In other studies, the treated membrane was found to resist disruption and dissolution by organic solvents which otherwise rapidly and completely dissolve untreated membranes. For example, after a treated membrane and an untreated membrane had been soaked in a solvent bath of gamma-butyrolactone at ambient temperatures for one hour, the untreated membrane had dissolved while the treated membrane was still intact. Moreover, prolonged exposure lasting 4 days of treated membrane to gamma-butyrolactone in a solvent bath at ambient temperatures showed no significant change from a treated membrane which had not been exposed to solvent. The data in Table 4 for flux recovery after exposure to protein illustrate these observations.

TABLE 4

| | BUFFER FLUX AFTER SAMPLE FILTRATION* [liters/hour-square meter] | |
|---|---|---|
| SAMPLE | BEFORE SOLVENT | AFTER SOLVENT** |
| buffer | 41 | 44 |
| myoglobin | 44 | 46 |
| ovalbumin | 44 | 46 |
| bovine serum albumin | 44 | 46 |
| bovine gamma-globuline | 41 | 41 |

*10 psi transmembrane pressure difference.
**Solvent bath was 100% gamma-butyrolactone at ambient temperature, and the membrane solvent exposure time was 4 days.

EXAMPLE 6

A membrane composed of polyacrylonitrile containing polymers was treated in a formaldehyde reaction bath containing 5.8 parts of paraformaldehyde, 44.2 parts of concentrated sulfuric acid and 50 parts of concentrated acetic acid. The treatment was conducted for 6 hours at 23° C. The treated membrane was soaked in an ice cold water bath at 2° C. for 30 minutes and then soaked for 60 minutes at 23° C. in a aqueous bath containing 3.8 parts of sodium borate, pH=9.

The treated article had hydrophilic character, illustrated by water spreading. Studies performed as described in the above examples with the membrane mounted in a stirred cell, showed that the treated membrane recovered its initial buffer flux after ultrafiltration of protein solutions.

EXAMPLE 7

A porous article in the form of a membrane was treated as in example #3. The membrane was then exposed to an aqueous solution consisting approximately of 0.01M sodium carbonate, 0.3M sodium chloride, and 2 milligrams per ml of "reactive dye". The reactive dye was Procion Red Reactive Dye MX-2B (PolySciences), which is a red colored, chromophore-substituted, triazinyl-halide which reacts like an acyl-halide with suitable nucleophiles, among which are N-methylolamides of the present invention. The reaction between the reactive dye and the treated membrane was conducted overnight (e.g., 16 hours) at ambient temperatures. The reacted membrane was extensively washed with water and saline solutions to remove unreacted dye. The resulting membrane was found to be permanently derivatized to show a red color which could not be removed by further washings. In this example, the red chromophore is considered as a potential affinity-sorptive ligand, while the reactive triazinyl moiety represents a well established reagent for linking affinity ligands in general to suitable matrix materials (e.g., Hodgins, L. T. and Levy, M.: Affinity Adsorbent Preparation: Chemical Features of Agarose Derivatization with Trichloro-s-triazine, J. Chromatogr, 202:381 (1980)).

What is claimed is:

1. A matrix comprising molecules of a nitrile-containing polymer which provides solely on the surface of the matrix sufficient uncharged, substituted amide groups to render the surface hydrophilic.

2. A matrix of claim 1, wherein the polymer is a homopolymer.

3. A matrix of claim 1, wherein the polymer is a copolymer.

4. A matrix of claim 3, wherein the uncharged, substituted amide groups are attached to less than all the monomers of the copolymer.

5. A matrix of claim 1, wherein the polymer is blended with other polymers.

6. A matrix of claim 1, wherein the polymer is grafted to another polymer.

7. A matrix of claim 1, wherein the hydrophilic surface has a contact angle of less than about 30 degrees when measured in a pH between 2 and 12.

8. A matrix of claim 7, wherein the hydrophilic surface has a contact angle less than about 15 degrees.

9. A matrix of claim 1, wherein the substituted amide groups are derived from nitrile groups of the nitrile-containing polymer.

10. A matrix of claim 1, wherein the substituted amide groups are grafted to the polymer or attached to monomers which are grafted to the polymer.

11. A matrix of claim 1, wherein the polymer comprises an acrylonitrile-type monomer.

12. A matrix of claim 11, wherein the acrylonitrile-type monomer is acrylonitrile or methacrylonitrile.

13. A matrix of claim 12, wherein the substituted amide groups comprises N-methylolamide groups.

14. A matrix of claim 13, wherein the N-methylolamide groups are defined from nitrile groups of the nitrile-containing polymer.

15. A matrix of claim 13, wherein the N-methylolamide groups are grafted to the polymer or attached to monomers which are grafted to the polymer.

16. The matrix of claim 1 further comprising a plurality of ligands attached to a portion of the substituted amide groups.

17. A matrix of claim 16, wherein each of the ligands comprises a bio-selective affinity group.

18. A matrix of claim 16, wherein the bio-selective, affinity group comprises a nucleic acid, polynuclotide, monosaccharide, polysaccharide, lipid, amino acid, peptide, protein, hormone, vitamin, metabolic co-factor, drug, antibiotic or a combination thereof.

19. A matrix of claim 17, wherein each of the ligands comprise a coupling molecule disposed between the substituted amide group and the bio-selective affinity group.

20. The matrix of claim 1, wherein molecules of the polymer are crosslinked to other such molecules.

21. A matrix of claim 20, wherein the substituted amide groups are N-methylolamide groups and wherein the crosslinking is by means of a methylene-bis-amide.

22. A matrix comprising molecules of a nitrile-containing polymer having reactive pendent groups which provides solely on the surface of the matrix sufficient uncharged, hydrophilic polar groups to render the surface hydrophilic, the polar groups having been obtained by derivatization of the reactive pendent groups of the polymer.

23. A matrix of claim 22, wherein the reactive pendent groups are nitrile groups.

24. A matrix of claim 23, wherein the polar groups are substituted amide groups.

25. A matrix of claim 24, wherein the polymer comprises an acrylonitrile-type monomer and the substituted amide groups comprise N-methylolamide groups.

26. A matrix of claim 25 further comprising a plurality of ligands attached to a portion of the N-methylolamide groups.

27. A matrix of claim 26, wherein each of the ligands comprises a bio-selective affinity group.

28. A matrix of claim 25, wherein the molecules of the polymer are crosslinked to other such molecules by means of methylene-bis-amide.

29. An article of manufacture comprising the matrix of claim 1 or 22.

30. An article of claim 29, wherein at least a portion of the exterior of the article comprises the hydrophilic surface of the matrix.

31. An article of claim 29, wherein the hydrophilic surface of the matrix defines pores.

32. An article of claim 31, wherein the article is porous.

33. An article of claim 32, wherein the article is a filter, membrane, bead, non-spherical particle, hollow fiber, solid fiber, rod, fabric, screen or separation medium.

34. An article of claim 29, wherein the article is a porous membrane, the polymer comprises acrylonitrile or methacrylonitrile, and the substituted amide groups are N-methylolamide groups.

35. An article of claim 34, wherein the molecules of the polymer are crosslinked to other such molecules.

36. An article of claim 29, wherein the article is non-porous.

37. An article of claim 36, wherein the article is a bead, non-spherical particle, hollow fiber, solid fiber, rod, sheet, or separation medium.

38. An article of claim 36, wherein the polymer comprises acrylonitrile or methacrylonitrile and the substituted amide groups are N-methylolamide.

39. An article of claim 38, wherein the molecules of the polymer are crosslinked to other such molecules.

40. A method of producing a matrix having a hydrophilic surface which comprises treating molecules of a nitrile-containing polymer so as to provide solely on the surface of the matrix sufficient uncharged substituted amide groups to render the surface hydrophilic.

41. A method of claim 40, wherein the treating comprises contacting the molecules of the polymer with an aldehyde or an aldehyde-generating compound.

42. An method of claim 41, wherein the polymer is contacted with formaldehyde.

43. A method of claim 41, wherein the aldehyde-generating compound comprises dimethoxymethane, trioxane, or paraformaldehyde.

44. A method of claim 41, wherein contacting with the aldehyde or aldehyde-generating compound is carried out in the presence of a catalyst.

45. A method of claim 44, wherein the catalyst comprises an acid or an acid-generating substance.

46. A method of claim 45, wherein the catalyst comprises a blend of acids.

47. A method of claim 46, the blend of acids comprises a strong acid and a weak acid.

48. A method of claim 47, wherein the degree of hydrophilicity of the hydrophilic surface is controlled by the ratio of concentrations of the strong acid, the weak acid and the aldehyde or aldehyde-generating compound.

49. A method of claim 45, wherein acid or acid-generating substance is acetic acid, hydrochloric acid, phosphoric acid, sulfuric acid, an alkylsulfuric acid, an alkylsulfonic acid, a halosulfonic acid, boron trifluoride, or aluminum chloride.

50. A method of claim 49, wherein the acid or acid-generating substance is acetic acid, sulfuric acid or hydrochloric acid.

51. The method of claim 45, wherein the rate of producing the matrix is controlled by controlling the strength or concentration of the acid or acid-generating substance.

52. A method of claim 40, wherein the matrix is produced in the form of a porous article.

53. A method of claim 52, wherein the porous article is a membrane.

54. A method of claim 40, wherein the matrix is produced in the form of a non-porous article.

55. A method of claim wherein the substituted amide groups comprises N-methylolamide groups.

56. The method of claim 40, which further comprises contacting the hydrophilic surface with reagents capable of donating a plurality of ligands so as to attach the ligands to a portion of the substituted amide groups.

57. A method of claim 56, wherein each of the ligands is a bio-selective, affinity group and comprises a nucleic acid, polynuclotide, monosaccharide, polysaccharide, lipid, amino acid, peptide, protein, hormone, vitamin, metabolic co-factor, drug, antibiotic, or a combination thereof.

58. The method of claim 56, wherein the substituted amide groups of some of the polymer molecules on the hydrophilic surface of the matrix are crosslinked to substituted amide groups of other polymer molecules on the hydrophilic surface of the matrix.

59. A method of claim 41, wherein the contacting is effected by soaking the polymer in a reagent bath containing the aldehyde or the aldehyde-generating compound.

60. A method of claim 59, wherein the polymer is contacted with a formaldehyde-generating compound, the contacting is effected in the presence of an acid, the polymer comprises an acrylonitrile-type monomer and the substituted amide groups are N-methylolamide groups.

61. A method of claim 60, wherein the matrix is produced in the form of a porous article, the hydrophilic surface of the matrix defines pores, the soaking is for about several minutes to about 24 hours, and the temperature of the reagent bath is in a range from about 10° C. to about 60° C.

62. A matrix produced by the method of claim 40.

63. In the methods of filtration, ultrafiltration, microfiltration, reverse osmosis, dialysis, pervaporation, or sieving, the improvement, which comprises using the article of claim 29.

64. In the methods of affinity chromatography, affinity purification, affinity separation, or affinity adsorption, the improvement which comprises using the article of claim 29.

65. A modified article of manufacture comprising an article and the matrix of claim 1 or 22, the matrix covering at least a portion of the exterior of the article.

66. A modified article of claim 65, wherein at least a portion of the exterior of the modified article comprises the hydrophilic surface of the matrix.

67. A modified article of claim 66, wherein the article is a membrane, the polymer comprises an acrylonitrile-type monomer, and the substituted amide groups are N-methylolamide groups.

68. A method of producing a modified article which comprises forming an article in which at least a portion of the exterior of the article comprises molecules of a nitrile-containing polymer and treating the article so formed so as to provide solely on the exterior of the article sufficient uncharged substituted amide groups to render the exterior hydrophilic.

69. A method of claim 68, wherein treating comprises contacting the article with an aldehyde or aldehyde-generating compound.

70. A method of claim 69, wherein contacting with the aldehyde or aldehyde-generating compound is carried out in the presence of a catalyst.

71. A method of claim 70, wherein the catalyst comprises an acid or acid-generating substance or a blend of acids.

72. The method of claim 68 which further comprises contacting the hydrophilic exterior with reagents capable of donating a plurality of ligands so as to attach the ligands to a portion of the substituted amide groups.

73. A modified article produced by the method of claim 68.

74. In the methods of filtration, ultrafiltration, microfiltration, reverse osmosis, dialysis, pervaporation, or sieving, the improvement which comprises using the modified article of claim 65.

75. In the methods of affinity chromatography, affinity purification, affinity separation, or affinity adsorption, the improvement which comprises using the modified article of claim 65.

* * * * *